United States Patent
Guderian et al.

(10) Patent No.: US 6,902,589 B1
(45) Date of Patent: Jun. 7, 2005

(54) METHOD FOR PRODUCING SHAPED, ACTIVATED CHARCOAL

(75) Inventors: Joachim Guderian, Castrop-Rauxel (DE); Volker Heil, Dortmund (DE); Christian Horn, Dortmund (DE); Michael Feseker, Dortmund (DE); Jens Sohnemann, Dortmund (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 170 days.

(21) Appl. No.: 10/018,117

(22) PCT Filed: Jun. 6, 2000

(86) PCT No.: PCT/DE00/01881

§ 371 (c)(1),
(2), (4) Date: Dec. 14, 2001

(87) PCT Pub. No.: WO00/78138

PCT Pub. Date: Dec. 28, 2000

(30) Foreign Application Priority Data

| Jun. 18, 1999 | (DE) | ......................................... 199 28 001 |
| Dec. 17, 1999 | (DE) | ......................................... 199 60 921 |
| Jan. 28, 2000 | (DE) | ......................................... 100 03 660 |

(51) Int. Cl.[7] .................................................. C10L 5/00
(52) U.S. Cl. ............................ 44/550; 44/551; 44/564; 44/565; 44/567; 44/569; 44/570; 44/577; 44/580; 44/589; 44/590; 44/591; 44/598; 44/599; 264/29.1; 264/29.6; 502/418; 502/428; 502/429; 502/430; 502/437
(58) Field of Search .................... 44/550, 551, 564, 44/565, 567, 569, 570, 577, 580, 589, 590, 591, 598, 599; 264/29.1, 29.6; 502/418, 428, 429, 430, 437

(56) References Cited

U.S. PATENT DOCUMENTS

| 2,546,903 | A | | 3/1951 | Morrell |
| 4,002,587 | A | | 1/1977 | Watanabe et al. |
| 5,306,675 | A | | 4/1994 | Wu et al. |
| 5,498,589 | A | * | 3/1996 | Schroter et al. ............ 502/416 |

FOREIGN PATENT DOCUMENTS

| DE | 38 34 743 | 4/1990 |
| DE | 41 32 971 | 4/1993 |
| DE | 42 34 785 | 4/1993 |
| DE | 42 34 786 | 4/1993 |
| DE | 44 16 576 | 11/1995 |
| EP | 0 423 967 | 10/1990 |
| EP | 0 725 036 | 8/1996 |
| JP | 05 262511 | 11/1993 |
| RU | 2 038 295 | 6/1995 |
| RU | 2 086 504 | 8/1997 |
| SU | 971 789 | 11/1982 |
| SU | 1 414 777 | 8/1988 |

* cited by examiner

*Primary Examiner*—Cephia D. Toomer
(74) *Attorney, Agent, or Firm*—Collard & Roe, P.C.

(57) ABSTRACT

The invention relates to a method for producing shaped, activated charcoal. According to the method, after being ground, carbon-bearing material, or a mixture of several carbon-bearing materials are rendered homogenous with a binding agent which contains water, or a mixture of several binding agents, at least one of which contains water. The mixture of carbon-bearing material and binding agent is then formed into shaped bodies. According to the invention, in order to consolidate the grain formation, these are dried until they exhibit a maximum total water content of 3% by wt. in relation to the shaped body. The shaped bodies which have been formed and dried in this manner are then subjected to a carbonization and subsequently a gas activation process.

25 Claims, 1 Drawing Sheet

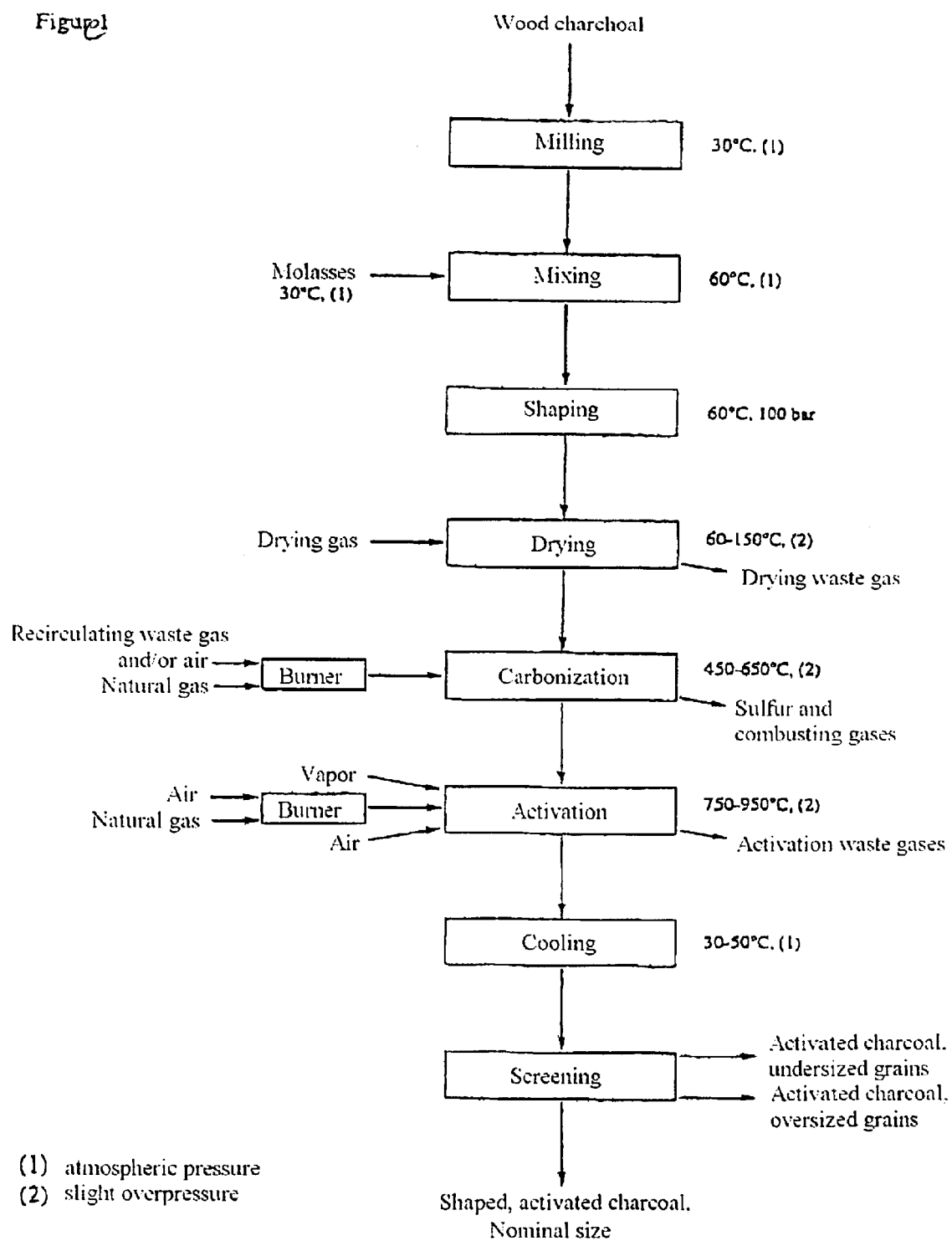

METHOD FOR PRODUCING SHAPED, ACTIVATED CHARCOAL

CROSS REFERENCE TO RELATED APPLICATIONS

Applicants claim priority under 35 U.S.C. §119 of German Application Nos. 199 28 001.0, 199 60 921.7, and 100 03 660.0, bearing the filing dates of Jun. 18, 1999, Dec. 17, 1999, and Jan. 28, 2000, respectively. Applicants also claim priority under 35 U.S.C. §120 of PCT/DE00/01881 filed Jun. 6, 2000. The international application under PCT article 21(2) was not published in English.

This invention relates to a method for producing high-quality shaped, activated charcoal and the high-quality shaped, activated charcoal obtainable via this procedure.

Activated charcoal is understood as carbon structures comprised of the smallest graphite crystallites and amorphous carbon with a porous structure and internal surfaces between 500 and 1500 $m^2/g$. In addition to carbon, the highly active structure also contains small quantities of chemically bound oxygen and hydrogen. Further, activated charcoal can contain up to approx. 25% by wt. minerals. Activated charcoals are used on a large scale to clean liquids and gases, for example. Due to its large internal surface, the activated charcoal here acts as an adsorbent to remove the undesired or harmful constituents. For example, activated charcoal can be used to remove: dyes, flavorings and perfumes comprised of gases, chlorine and ozone from water, radioactive gases in nuclear engineering. Activated charcoal can also be used as an adsorbent to recycle valuable solvent or adsorb the tank losses during refueling.

Coal or carbon-bearing materials are either heated with dehydrating agents and then cleaned via rinsing (chemical activation) or carbonized via dry distillation and then oxidatively activated with water vapor and/or carbon dioxide (gas activation) to produce activated charcoal. Vegetable (e.g., wood, peat, nut shells, fruit pits, lignites, wood charcoal), animal (e.g., blood, bone) and/or mineral (e.g., lignite or hard coal, petrochemical hydrocarbons) raw materials can be used as the carbon-bearing materials.

For applications in liquid and gas cleaning, activated charcoal must be present in powder, grain or granulated form. The corresponding shaped, activated charcoal is produced by activating a grain raw material or the carbon-bearing, pulverized raw material is made into a paste with a binding agent prior to activation, then briquetted and, if necessary, the briquettes are comminuted to the desired grain size.

Numerous methods for producing shaped, activated charcoal are known from prior art. In particular, they are also the subject of a series of patents or patent applications.

For example, DE 38 34 743 A1 describes a method for producing coarse-pored shaped-charcoal based on wood charcoal dust, wood charcoal tar as the binding agent and sodium hydroxide solution for impregnation via mixing, kneading, shaping, swelling and activating with water vapor or carbon dioxide. The wood charcoal dust, and hence the activated charcoal made out of the latter, contains a significant proportion of ash, depending on origin and raw material. However, this ash does not contribute to the formation of the active surface of the activated charcoal. Therefore, the resultant activated charcoals only have a moderate adsorption capacity. In addition, the activated charcoal must also be washed and dried.

DE 41 32 971 A1 describes a method for producing carbon molecular sieves out of very finely milled hard coal with the addition of hard coal tar pitch as the binding agent, in which the hard coal is oxidized with air before adding the binding agent, and activated with water vapor after swelling, and then treated with carbon-splitting hydrocarbons. Activated charcoal produced in this complicated procedure has a very narrow pore radius distribution in the micropore range that is especially suited for separating oxygen and nitrogen. The additional procedural outlay consisting of an oxidative pretreatment of the hard coal and a second activation stage using carbon-splitting hydrocarbons is not required or constitutes an impediment for the majority of activated charcoal applications. In addition, the use of tar or peat as the binding agent is associated with disadvantages given the increasing importance of issues relating to environmental policy. Both tar and peat are toxic to humans and the ecology and are difficult to handle since all storage facilities and transport paths must be heated.

EP 423 967 B1 describes a method for producing grain activated charcoal using a chemical activation process. The starting materials are carbon-bearing vegetable products, e.g., nut shells, fruit or olive pits, with a concentration of more than 30% by weight of natural binding agent, in particular lignin. This starting material is comminuted, mixed with phosphoric acid for impregnation, palletized and carbonized. Activated charcoals made out of such vegetable products have too low a hardness for various applications. In addition, as opposed to gas activation, chemical activation requires the additional step of washing to remove the acid. In this case, additional legal statutes for handling chemical substances necessary for washing and old chemicals must be taken into account, and additional investment costs are incurred.

U.S. Pat. No. 5,306,675 describes a method for producing briquettes to produce shaped, activated charcoal. The educt is a mixture of coal and/or graphite, 3–10% methyl cellulose and/or its derivatives as the binding agent, 0.5–5% polyvinyl alcohol as the co-binding agent, and 100–200% water relative to the carbon. After being shaped, the activated charcoal bodies are first irradiated with electromagnetic radiation, and then stored in a conventional furnace until their water content measures 15% of the original value. During further processing to shaped, activated charcoal, i.e., carbonization and activation, the active charcoal briquettes peel and crack. In addition, briquettes produced with this method are not strong enough for many applications, and have a rather low hardness.

DE 42 34 785 C2 and DE 42 34 786 C2 describe methods for producing shaped, activated charcoal by milling educts, mixing with a binding agent, molding or extruding the mixture into briquettes, and then carbonizing and activating the briquettes in a special rotary kiln. DE 42 34 786 C2 uses wood charcoal obtained from old timber as the educt, while DE 42 34 785 C2 uses a mixture of wood charcoal and dried clarifier sludge granulate. Due to the low-quality educts old timber and clarifier sludge, the fabricated activated charcoals have negative effects on the product properties. For example, the ash content of an activated charcoal produced according to DE 42 34 785 C2 is very high at 10 to over 30% by wt. (relative to the dry activated charcoal). As a consequence, the values for the specific surface of the activated charcoal are clearly below those of very good products (e.g., only an iodine number of 950 $m^2/g$ can be measured when using clarifier sludge and wood coal in a ratio of 1:1). The activated charcoals produced with these two methods also exhibit generally undesired cracks in the material, which can result in a weakening or even peeling of the grain composite. In addition, a more comprehensive gas cleaning system must be installed during carbonization when using clarifier sludge, and in particular loaded old timber, which leads to additional investment costs. Further, interfering substances such as inerts, iron or non-iron metals (FE/NE metals), etc. must be expected when using coal from old timber, which must be removed using the appropriate procedures.

Therefore, the object of this invention is to provide high-quality shaped, activated charcoal and a method for producing this high-quality shaped, activated charcoal that does not exhibit the disadvantages inherent in the prior art. In particular, the shaped, activated charcoal is to be inexpensively and easily produced, and exhibit large active surfaces and a good hardness. It must also be possible to use the method according to the invention in already existing plants for producing shaped, activated charcoal without any major modifications.

This object is achieved by the method according to the main claim and the shaped, activated charcoal according to subsidiary claim 24. Special characteristics of the method are described in the subclaims.

In the procedure for producing formed, activated charcoal according to the invention, a carbon-bearing material or a mixture of several carbon-bearing materials are homogenously mixed after being milled or ground with an aqueous binding agent or a mixture of several binding agents, of which at least one contains water. The mixture of carbon-bearing materials and binding agents is then shaped into molded articles. These are dried according to the invention to an overall water content of at most 3% by wt. relative to the molded article weight. The molded articles shaped and dried in this way are then subjected to carbonization, followed by gas activation. In this application, water-containing binding agents are to be understood here generally as those binding agents having a water content of between 10 and 50% by wt., preferably between 15 and 25% by wt. Without limiting the universality, examples for aqueous binding agents used according to the invention include sugar beet molasses, sugar cane molasses or aqueous solutions of sodium carboxymethyl cellulose, starch, polyvinyl acetate or polyvinyl alcohol.

All carbon-bearing organic materials can be used as the carbon-bearing material according to the invention. This material is preferably free of binding agents. In addition, a carbon-bearing material is preferably used that was produced through natural and/or artificial thermal treatment of a carbon-containing vegetable product. Particularly preferred in this respect are wood coal and/or wood coal from old timber. Other advantageously used carbon-bearing materials include peat coal, hard vegetable cores, nut shells, coal coke and lignitic coke. However, wood coals, in particular beechwood coals, are preferably used, since the shaped, activated charcoal fabricated out of wood coal according to the invention exhibits particularly good product characteristics, e.g., a high adsorption capacity and a very good hardness of the shaped, activated charcoal article. According to the invention, this is facilitated by the natural capillary structure of the wood charcoal, which already model the macropores of the shaped, activated charcoal article.

One or several aggregates can optimally be added to the carbon-bearing material. Suitable aggregates improve the processability of the mixture consisting of carbon-bearing material and binding agent while shaping and/or have a catalytic effect during gas activation. According to the invention, all aggregates known in prior art can be used for producing activated charcoal. Preferably employed as the aggregates are KOH solution, $K_2CO_3$, surfactants, stearates and/or carboxymethyl cellulose (CMC) with respective percentages by weight of up to 20% by wt. relative to the mixture consisting of carbon-bearing material and binding agent.

According to the invention, the carbon-bearing material and, if necessary, the aggregates are finely milled. 100% of the milled product here preferably has a grain size of less than 60 $\mu$m. A grain spectrum of 100% by wt. less than 60 $\mu$m and at least 95% by wt. between 10 and 45 $\mu$m is particularly preferred. In a preferred variant, at least one carbon-bearing material is already milled prior to use.

The product of milling is homogenously mixed with a water-containing binding agent or a mixture of several binding agents, of which at least one contains water. In preferred embodiments, binding agents or carbon-bearing materials are first homogeneously mixed and then blended with the carbon-bearing materials or binding agents. Homogeneous mixing can take place in a sigma or Z kneader, for example.

All binding agents that wet the carbon-bearing materials in a homogeneous mixture and can form a hard matrix after drying and carbonization are suitable as the binding agents. According to the invention, at least one water-containing binding agent is used for this purpose. Molasses, in particular sugar beet and/or sugar cane molasses, or aqueous solutions of sodium carboxymethyl cellulose, starch, polyvinyl acetate or alcohol are especially preferred as the water-containing binding agents. As opposed to conventional binding agents, molasses has no constituents toxic to humans or the ecology, is additionally readily available, easy to handle and inexpensive.

Of a mixture of water-containing and non-watercontaining binding agents, all binding agents known from prior art can be used as the non-water-containing binding agents. Here, preference is given to coal tar, wood coal tar, bitumen and/or inorganic gels (e.g., silica gel, iron or aluminum hydroxide).

The percentage of binding agent or binding agent mixture in the composition can vary within broad limits. 10 to 60% by wt. of binding agent relative to the mixture of carbon-bearing material and binding agent are preferably used. 25 to 40% by wt. binding agent is especially preferred.

After the homogeneous mixing of carbon-bearing material and binding agent, this mixture is shaped into molded articles of a suitable size via conventional shaping procedures. For example, the raw briquettes can be shaped using an edge mill, tuber or extruder. The steps of mixing and shaping are here preferably carried out in separate apparatuses. In a preferred embodiment of the method according to the invention, the carbon-bearing material is mixed with the binding agent in the same apparatus as the subsequent shaping. This preferably takes place in an extruder.

The molded articles are advantageously dried to $\leq 3\%$ by wt. residual moisture or overall water content in an apparatus provided solely for this purpose, in which the retention time and heating rate or temperature can be flexibly set. By drying in a suitable apparatus instead of the torque tube typical for carbonization, the molded articles can be heated slowly and gently, if necessary in a fixed bed, so that the grain structure of the molded articles remains undamaged, and the molded articles are not comminuted or deformed. The intermediate product obtained after drying hence exhibits optimized properties relative to hardness and grain structure, and can therefore be smoothly carbonized and activated, without the grain structure being disrupted in the process. During direct carbonization of the undried molded article, the grain structure becomes weakened by too high a water vapor partial pressure inside the molded article at the high carbonization temperatures, which yields loss in hardness and peeling areas. The moist drying flue gases can also be separately removed, and hence do not get into the carbonization or activation gas stream, where they would sustain an uncontrolled activation reaction.

For drying purposes, a belt dryer is preferably used and the molded articles are advantageously dried in a fixed bed. It is especially preferred that the molded articles be dried to a residual moisture of ≦1% by wt.

In addition, the molded articles are also dried in a heated and, if necessary, oxygen-reduced or oxygen-free gas stream. The gas stream is routed in a suitable manner, preferably in a countercurrent or crosscurrent to the molded articles in the drying apparatus.

The molded articles are preferably dried within 0.2 to 12 hours. In this case, temperatures ranging from 40 to 170° C. are preferably used. It is especially preferred that the molded articles be dried within 0.5 to 6 hours and at 60 to 150° C. It is especially preferred that drying take place below the self-ignition temperature of the molded articles.

Low-volatile compounds and water escape during the gentle drying process, which causes the molded articles to become mechanically fixed. In addition, initial condensation reactions between the sugar molecules of the binding agent take place, in particular when using molasses as the binding agent. As a result, the mechanical fixing of the molded article is also accompanied by a chemical solidification due to drying.

After the molded articles have been dried, they are carbonized according to methods known in prior art for producing activated charcoal. Temperatures ranging from 400 to 750° C. are here preferably used as the target temperatures. In addition to the loss of volatile organic constituents, the carbon is carbonized out of the binding agent at these temperatures, and a shared carbon lattice is built up out of the carbon of the binding agent and that of the carbon-bearing material. It is especially preferred for carbonization to take place at 500 to 650° C.

In a preferred embodiment of the method according to the procedure, the molded articles are carbonized in a three-zone revolving tube. This revolving tube is distinguished by its special temperature control: in the first zone of the revolving tube, the treated material is preferably heated at 5° C./min to 250° C., and in the second zone preferably at 10° C./min to the target temperature; in the third zone, the briquettes stay at the desired temperature, during which the material and heat transport in the revolving tube is supported by lifting flights. This special temperature control in the three-zone revolving tube ensures a gentle expulsion of the volatile constituents from binding agent and carbon carrier. This is of importance in particular for the targeted formation of the macropore structure.

After carbonization, the molded articles are subjected to gas activation. The carbonisate is activated here with the help of a gas according to a method known from prior art. Activation preferably takes place at 700 to 1000° C. It is particularly preferred that temperatures of 800 to 950° C. be used. The molded articles can be activated using all gases known for this purpose. Water vapor and carbon dioxide are particularly suitable.

Surprisingly, it has been found that the method according to the invention achieves very good product hardness for the produced activated charcoals, in particular owing to the slow and gentle drying step. In addition to the slow heating rate, during which the moisture of the molded article is released over a long period of time, a fixed bed for the soft molded article is also advantageous. As a result, no undesired cracks, and hence weakening or even peeling or bursting of the grain structure, takes place during subsequent carbonization and activation of the molded articles. In addition, the separate step prevents the water moisture that arises while drying from getting into the gas stream of the carbonizer and potentially the activator, where it is undesired and can yield uncontrolled gas activation reactions.

The shaped activated charcoal articles produced with the method according to the invention exhibit very good product qualities. For example, the high abrasion resistance of the shaped, activated charcoal fabricated according to the invention also makes it suitable for reactivation, so that it can be reused several times. In addition, when using wood charcoal, the method optimally utilizes the wood structure of advantage in terms of the adsorption properties: The structures arising from the wood cells that are retained during the thermal processes are utilized as access pores for adsorption. With respect to the ash content and specific surface, the activated charcoal produced according to the invention achieves above-average values. Further, in particular the significant rise in hardness for the carbonisate and activate relative to that in prior art must be emphasized.

The adsorption and desorption characteristics of activated charcoal is essentially determined by its pore structure, i.e., pore diameter, volume and distribution. The large internal surface of activated charcoal can be primarily attributed to micropores with a radius of up to 2 nm. The pore structure of the resulting shaped, activated charcoal can advantageously be influenced in a targeted fashion with the method according to the invention, e.g., by suitably setting the parameters in the thermal processes of drying, carbonization and activation (e.g., temperature, retention time, vapor dosage), or suitably selecting (e.g., various wood charcoals, various water-containing binding agents) or preparing (e.g., grain size of milled carbon-bearing material, water content of binding agent) the raw materials. The use of aggregates can also influence the product properties in the desired manner. For example, using a very finely milled carbon-bearing material in conjunction with an elevated briquetting pressure while molding results in a harder carbonisate. If this carbonisate is activated for a comparatively long time at a low activation temperature, the activate will have an elevated share of micropores. In contrast, higher activation temperatures at shorter activation times yield activates with an expansive transition and macropore range.

Therefore, the properties of the activated charcoal produced according to the invention can be set by changing the formula or procedural parameters in a targeted fashion for specific applications. In particular, the activated charcoal produced according to the invention is suited to the various methods of solvent recovery, for obtaining and recycling gases and vapors, for adsorptive gas cleansing, for combustion gas preparation, for use in automotive filters (internal filters, tank loss filter), for drinking, waste and industrial water purification, and for the purification, deodorization and decoloration of liquids.

In addition, the method according to the invention advantageously makes it possible, for the first time, to produce a high-quality shaped, activated charcoal exclusively on the basis of reproductive raw materials by using educts like wood charcoal as the carbon-bearing material, and molasses as the water-containing binding agent. The method according to the invention therefore takes into account regulations governing production-integrated environmental protection through the use of ecologically harmless reproductive raw materials and process-internal heat control.

Further, the use of existing plants for producing shaped, activated charcoal is possible to a very large extent during the execution of the method according to the invention. Only a slight additional investment is required for the additional step of drying the molded articles in a furnace provided solely for this purpose.

The subject matter of the invention will be explained in greater detail based on several embodiments without limiting the universality.

FIG. 1 shows the diagrammatic sequence of the method according to the invention for producing shaped, activated charcoal based on a possible embodiment, in which wood charcoal is used as the carbon-bearing material, and molasses as the water-containing binding agent.

The educts used in the following examples 1 to 3 have the specifications listed in Table 1. Examples 1 and 2 describe production methods according to the invention for shaped, activated charcoal. Example 3 only examines the step of drying the molded articles and how that affects the hardness of the molded articles.

TABLE 1

Characteristic Material Data for the Educts

| Property Origin | Unit | Wood charcoal Beechwood | Molasses Sugar cane |
|---|---|---|---|
| Water content according to DIN 51718 | % by wt. | 5.9 | 19.6 |
| Ash content (i.wf.) according to DIN 51719 | % by wt. | 1.8 | 8.6 |
| Content of volatile constituents (i.wf.) according to DIN 51720 | % by wt. | 14.7 | |
| Sugar content according to Fehling | % by wt. | | 63.7 |

EXAMPLE 1

The wood charcoal is comminuted to a grain size of 95% by wt. <40 $\mu$m in a ball mill. A mixture of 63% by wt. coal dust and 37% by wt. molasses is produced with a Z kneader out of the educts (specifications per Table 1). Shaping takes place in an edge mill press, which compresses the material being mixed into briquettes with a diameter of 4 mm and a length of between 4 and 10 mm. The briquettes are then dried for 3 hours in a fixed bed in a recirculating air drying cabinet at 120° C. The residual moisture measures 0.92% by wt.

The dry briquettes are carbonized for a period of 2 hours at 500° C. in an inert gas atmosphere. The carbonisate is subsequently activated with water vapor in a rotary kiln at 850° C. for a period of 5.5 hours under an inert gas atmosphere. The shaped, activated charcoal produced in this way exhibits the product properties cited in Table 2.

TABLE 2

Characteristics Quality Properties of the Activated Charcoal

| Property | Unit | Specification |
|---|---|---|
| Ash content (i.wf.) according to DIN 51719 | % by wt. | 4.2 |
| Ball pan hardness according to ASTM D | % by wt. | 99.2 |

TABLE 2-continued

Characteristics Quality Properties of the Activated Charcoal

| Property | Unit | Specification |
|---|---|---|
| 3802-79 | | |
| Iodine number according to AWWA B 600-78 | mg/g | 1240 |
| Methylene blue number according to DBA 6 | ml | 29 |

EXAMPLE 2

The wood charcoal is comminuted to a grain size of 95% by wt. <27 $\mu$m in a ball mill. A mixture of 66.5% by wt. coal dust and 33.5% by wt. molasses is produced with a Z kneader out of the educts (specifications per Table 1). Shaping takes place in an edge mill press, which compresses the material being mixed into briquettes with a diameter of 2 mm and a length of between 2 and 10 mm. The briquettes are then dried for 3 hours in a fixed bed in a recirculating air drying cabinet at 120° C. The residual moisture measures 0.90% by wt.

The dry briquettes are carbonized for a period of 2 hours at 500° C. in an inert gas atmosphere. The carbonisate is subsequently activated with water vapor in a rotary kiln at 900° C. for a period of 5 hours under an inert gas atmosphere. The shaped, activated charcoal produced in this way exhibits the product properties cited in Table 3.

TABLE 3

Characteristics Quality Properties of the Activated Charcoal

| Property | Unit | Specification |
|---|---|---|
| Ash content (i.wf.) according to DIN 51719 | % by wt. | 6.8 |
| Ball pan hardness according to ASTM D 3802-79 | % by wt. | 98.8 |
| Iodine number according to AWWA B 600-78 | mg/g | 1201 |
| Methylene blue number according to DBA 6 | ml | 25 |

EXAMPLE 3

In this embodiment, the drying of the briquettes will be examined in greater detail. For these tests, a mixture of 63% by wt. charcoal dust and 37% by wt. molasses is used (specifications per Table 1). This mixture has a water content of approx. 11% by wt.

(i) Five partial beds of undried molded articles are prepared in flat tanks (bulk height approx. 20 mm) and dried in a fixed bed at 80° C. in a recirculating air dryer for between 0.5 and 4 h. The respective drying loss of the partial beds is documented. It asymptotically approaches a value averaging 12% by wt., wherein an average drying loss of 7.2% by wt. is already measured after 2 h.

(ii) In comparison to these data, a partial bed of undried pellets treated at rest in a $CO_2$-intertized furnace for 0.75 h at 300° C. experiences a drying loss of 27.9% by wt., wherein approx. 15% by wt. of volatile, organic compounds are expelled in addition to the water moisture. However, beds treated in this way are characterized by the appearance of fines, which consist of pellet pieces peeled off in disks. A random selection of individual pellets examined under a light microscope reveals a significantly higher number of deep, transverse cracks inside these molded articles.

(iii) A partial bed of undried molded articles is first dried in a fixed bed for 4 h at 80° C. and then while at rest in a $CO_2$-intertized furnace for 0.75 h at 300° C. The drying loss measures 28.7% by wt.

After the partial beds are dried according to the alternative methods mentioned above, the Ball-Pan hardness of the dried briquettes is subsequently determined according to ASTM D 3802-79, which are documented on Table 4.

TABLE 4

Mode of Treatment and Resulting Ball-Pan Hardness of Dried Briquettes

| Treatment | Ball-Pan Hardness according to ASTM D 3802-79 |
| --- | --- |
| (i) Resting storage at 80° C. for 4 h | 99.0% by wt. |
| (ii) Resting storage at 300° C. for 0.75 h | 99.2% by wt. |
| (iii) Resting storage at 80° C. for 4 h with subsequent storage at 300° C. for 0.75 h | 99.8% by wt. |

The dried briquettes have a good to very good hardness (compare Table 4). Even though the sample dried at 300° C. (ii) has a slightly better hardness than the sample dried at 80° C. (i), the treatment according to method (ii) is not advantageous. This stems from the fines generated through peeling. In addition, the briquettes dried according to method (ii), as mentioned above, exhibit cracks and crevices, which weaken the grain structure, in particular as regards the further thermal treatment during carbonization and activation. By contrast, the molded articles dried according to method (iii) achieve a very good hardness without any discernible peeling, cracks or crevices. This method (iii) adjusts the sequence of the procedure according to the invention satisfactorily well with respect to drying and subsequent further heating in the carbonizing tower.

What is claimed is:

1. A method for producing shaped, activated charcoal comprising the following steps:
   grinding one or more carbon-bearing materials;
   homogeneously mixing the milled carbon-bearing material with a water-containing binding agent or a mixture of several binding agents, of which at least one contains water;
   shaping the mixture consisting of carbon-bearing material and binding agent into molded articles;
   drying the molded articles before carbonization to set the grain structure to up to an overall water weight of ≦3% by wt.;
   drying the molded articles within 0.5 to 12 hours at temperatures of 40° C. up to 150° C.; wherein when drying the molded articles, a heated and, if necessary, oxygen-reduced or oxygen-free gas stream is passed over the molded articles;
   carbonizing the molded articles, and
   activating the molded articles by means of an activation gas.

2. The method according to claim 1, wherein drying takes place in a fixed bed and/or in a belt dryer.

3. The method according to claim 1, wherein the molded articles are dried to an overall water content of ≦1% by wt.

4. The method according to claim 1, wherein the molded articles are dried at below their self-ignition temperature.

5. The method according to claim 1, wherein the carbon-bearing material is wood charcoal, wood charcoal from old timber, peat coal, fruit pits, nut shells, coal coke and/or lignitic coke.

6. The method according to claim 1, wherein the carbon-bearing material used is carbonized via natural and/or synthetic thermal treatment of one or more carbon-bearing vegetable products.

7. The method according to claim 6, wherein the carbon-bearing material is wood charcoal and/or wood charcoal from old timber and from beechwood charcoal.

8. The method according to claim 1, wherein 100% by wt. of the carbon-bearing material is milled to a grain size of <60 μm.

9. The method according to claim 8, wherein at least 95% by wt. of the carbon-bearing material is milled to a grain size of between 10 and 45 μm.

10. The method according to claim 1, wherein the steps of mixing and shaping are carried out in one or two separate apparatuses.

11. The method according to claim 1, wherein the dried molded articles are carbonized at temperatures of 400 to 750° C.

12. The method according to claim 1, wherein the dried and carbonized molded articles are activated at temperatures of 700 to 1000° C.

13. The method according to claim 1, wherein the dried and carbonized molded articles are activated with water vapor and/or carbon dioxide.

14. The method according to claim 1, wherein the carbon-bearing materials are homogeneously mixed before, during or after milling, and that this mixture of solids is subsequently homogeneously mixed with the water-containing binding agent or the mixture of several binding agents, of which at least one contains water.

15. The method according to claim 1, wherein at least one already milled carbon-bearing material is used.

16. The method according to claim 1,
   wherein the molded articles are dried at temperatures of 60 to 150° C.

17. The method according to claim 1,
   wherein the molded articles are dried within 0.5 to 6 hours.

18. The method according to claim 1,
   wherein coal tar, wood charcoal tar, bitumen and/or an inorganic gel is used as any non-water-containing binding agent that might be present.

19. The method according to claim 1,
   wherein 10 to 60% by wt. binding agent, are used relative to the mixture consisting of carbon-bearing material and binding agent.

20. The method according to claim 1,
   wherein the binding agents, of which at least one contains water, are first homogeneously mixed with each other, and that this binding agent mixture is subsequently homogeneously mixed with the carbon-bearing material or the mixture of several carbon-bearing materials.

21. A method for producing shaped, activated charcoal comprising the following steps:
   grinding one or more carbon-bearing materials;
   homogeneously mixing the milled carbon-bearing material with a water-containing binding agent or a mixture of several binding agents, of which at least one contains water;
   shaping the mixture consisting of carbon-bearing material and binding agent into molded articles;
   drying the molded articles before carbonization to set the grain structure to up to an overall water weight of ≦3% by wt.;
   drying the molded articles within 0.5 to 12 hours at temperatures of 40° C. up to 150° C.;

carbonizing the molded articles, and activating the molded articles by means of an activation gas; and wherein the water-containing binding agent is a binding agent with 10 to 50% by wt. water.

22. A method for producing shaped, activated charcoal comprising the following steps:

grinding one or more carbon-bearing materials;

homogeneously mixing the milled carbon-bearing material with a water-containing binding agent comprising molasses;

shaping the mixture consisting of carbon-bearing material and binding agent into molded articles;

drying the molded articles before carbonization to set the grain structure to up to an overall water weight of $\leq 3\%$ by wt.;

drying the molded articles within 0.5 to 12 hours at temperatures of 40° C. up to 150° C.;

carbonizing the molded articles, and activating the molded articles by means of an activation gas.

23. A method for producing shaped, activated charcoal comprising the following steps:

grinding one or more carbon-bearing materials;

homogeneously mixing the milled carbon-bearing material with a water-containing binding agent or a mixture of several binding agents, of which at least one contains water;

shaping the mixture consisting of carbon-bearing material and binding agent into molded articles;

drying the molded articles before carbonization to set the grain structure to up to an overall water weight of $\leq 3\%$ by wt.;

drying the molded articles within 0.5 to 12 hours at temperatures of 40° C. up to 150° C.;

carbonizing the molded articles, wherein the dried molded articles are carbonized in a three-zone torque tube; and activating the molded articles by means of an activation gas.

24. A method for producing shaped, activated charcoal comprising the following steps:

grinding one or more carbon-bearing materials;

homogeneously mixing the milled carbon-bearing material with a water-containing binding agent or a mixture of several binding agents, of which at least one contains water;

adding one or more aggregates to the carbon-bearing material and/or the binding agent;

shaping the mixture consisting of carbon-bearing material and binding agent and one or more aggregates into molded articles;

drying the molded articles before carbonization to set the grain structure to up to an overall water weight of $\leq 3\%$ by wt.;

drying the molded articles within 0.5 to 12 hours at temperatures of 40° C. up to 150° C.; wherein when drying the molded articles, a heated and, if necessary, oxygen-reduced or oxygen-free gas stream is passed over the molded articles;

carbonizing the molded articles, and activating the molded articles by means of an activation gas.

25. The method according to claim 24, wherein KOH solution $K_2CO_3$, surfactant, stearate and/or carboxymethyl cellulose are added as the aggregate.

* * * * *